US012271153B2

(12) United States Patent
Maire et al.

(10) Patent No.: US 12,271,153 B2
(45) Date of Patent: Apr. 8, 2025

(54) WATCH CASE COMPRISING A MECHANISM FOR ACTUATING A MOVING INDICATOR

(71) Applicant: The Swatch Group Research and Development Ltd, Marin (CH)

(72) Inventors: François Maire, Bienne (CH); Philipp Tschumi, Niederwil (CH)

(73) Assignee: The Swatch Group Research and Development Ltd, Marin (CH)

( * ) Notice: Subject to any disclaimer, the term of this patent is extended or adjusted under 35 U.S.C. 154(b) by 435 days.

(21) Appl. No.: 17/736,529

(22) Filed: May 4, 2022

(65) Prior Publication Data

US 2022/0357705 A1 Nov. 10, 2022

(30) Foreign Application Priority Data

May 5, 2021 (EP) .................................... 21172240

(51) Int. Cl.
*G04B 19/28* (2006.01)
*G04B 27/08* (2006.01)

(52) U.S. Cl.
CPC ........... *G04B 19/283* (2013.01); *G04B 27/08* (2013.01)

(58) Field of Classification Search
CPC ............................ G04B 19/223; G04B 19/225
See application file for complete search history.

(56) References Cited

U.S. PATENT DOCUMENTS 3,548,588 A * 12/1970 Piquerez .............. G04B 19/166 368/294
5,742,565 A * 4/1998 Cuinet ................. G04B 19/283 368/190
2019/0187619 A1* 6/2019 Wahler ............... G04B 37/0041

FOREIGN PATENT DOCUMENTS

| | | | |
|---|---|---|---|
| CH | 304 088 | A | 12/1954 |
| FR | 727 104 | A | 6/1932 |
| GB | 1 241 471 | A | 8/1971 |
| JP | 63-134991 | A | 6/1988 |
| JP | 4558270 | B2 | 10/2010 |
| JP | 2018-146505 | A | 9/2018 |

OTHER PUBLICATIONS

Translation of CH304088, Espacenet (Year: 1954).*
Translation of JP 2018156505, Espacenet (Year: 2018).*
European Search Report for EP 21 17 2240 dated Sep. 29, 2021.

* cited by examiner

*Primary Examiner* — Renee S Luebke
*Assistant Examiner* — Matthew Daniel Hwang
(74) *Attorney, Agent, or Firm* — Sughrue Mion, PLLC

(57) ABSTRACT

Provided is a watch case (10) that includes a middle (11) to which are attached a crystal (12) and a back (13) delimiting an internal volume in which is arranged a horological movement (14) intended to drive indicating members. The case (10) also includes a mechanism for actuating an indicator (16) capable of moving in rotation and housed inside the internal volume of the case (10), the actuation mechanism including a bezel (15) capable of moving in rotation and intended to be handled by a user, and a transmission pinion (17) arranged such that it meshes with the bezel (15) and the indicator (16), the respective axes of rotation of the bezel (15), the transmission pinion (17) and the indicator (16) being parallel to one another.

19 Claims, 3 Drawing Sheets

WATCH CASE COMPRISING A MECHANISM FOR ACTUATING A MOVING INDICATOR

CROSS REFERENCE TO RELATED APPLICATIONS

This application claims the benefit of priority from on European Patent Application No. Ep 21172240.0 filed on May 5, 2021, the disclosure of which is incorporated herein in its entirely by reference.

TECHNICAL FIELD OF THE INVENTION

The invention relates to the field of horology, and in particular that of timepiece components.

More particularly, the invention relates to a watch case comprising a mechanism for actuating a moving indicator.

TECHNOLOGICAL BACKGROUND

Watch cases comprising one or more rotating bezels intended to indicate certain information to a user exist.

In particular, cases are known to have a fluted rotating bezel adapted to drive an indicator located inside the middle which can be used to count a flight time for aircraft pilots.

In particular, the driving of an indicator through the displacement of a rotating bezel is known from many documents.

For example, the Swiss patent No. 681127 filed by WERTHANOR describes a moving assembly formed by a rotating bezel, a crystal and a flange, said moving assembly being separated from the middle by a packing.

In addition to being relatively complex to produce, this type of mechanism has a drawback in terms of its watertightness and airtightness. Generally speaking, these mechanisms are very sensitive to attack from the external environment.

The European patent No. 1342131 filed by LVMH describes a rotating bezel provided with a mechanism for driving an indicator by magnetic attraction. The operation of this type of device can by disrupted when the watch is located in the vicinity of magnetic fields.

SUMMARY OF THE INVENTION

The invention overcomes the aforementioned drawbacks by providing a simple and reliable solution for driving an indicator inside the case of a watch.

To this end, the present invention relates to a watch case comprising a middle to which are attached a crystal and a back delimiting an internal volume in which is arranged a horological movement intended to drive displays displaying a time value, such as hours and minutes, said case further comprising a mechanism for actuating an indicator capable of moving in rotation and housed inside the internal volume of the case, wherein said actuation mechanism includes a bezel capable of moving in rotation and intended to be handled by a user, and a transmission pinion arranged such that it meshes with the bezel and the indicator, the respective axes of rotation of the bezel, the transmission pinion and the indicator being parallel to one another.

Thus, thanks to the features of the present invention, the operation of the actuating mechanism is not sensitive to magnetic fields and is relatively simple to produce.

Advantageously, the present invention includes a reduced number of moving parts, which helps to guarantee the reliability of the actuation mechanism.

Even more advantageously, the features of the invention allow an effective seal to be guaranteed between the internal volume of the case and the external environment insofar as the bezel is not mechanically linked to the crystal.

According to specific embodiments, the invention can further include one or more of the following features, which must be considered singly or according to any combinations technically possible.

According to specific embodiments, the bezel, the indicator and the transmission pinion are configured such that the bezel and the indicator pivot at the same angular velocity when the bezel is driven in rotation.

According to specific embodiments, the transmission pinion comprises an upper toothing and a lower toothing, extending coaxially to one another such that the upper toothing meshes with a toothing of the bezel and such that the lower toothing meshes with a toothing of the indicator.

According to specific embodiments, the upper and lower toothings are separated from one another by a radial groove that receives a packing.

This disposition procures an effective seal between the internal volume of the case and the external environment.

According to specific embodiments, the indicator is formed by a flange comprising a cylindrical wall at a lower end of which a toothed radial lip extends radially from an outer face of said cylindrical wall, said radial lip being arranged facing a radial bearing surface of the middle so as to cooperate with the lower toothing of the meshing transmission pinion, said flange further including an index extending from an inner face of the cylindrical wall.

According to specific embodiments, the bezel is engaged in an axial annular groove of the middle, by means of a cylindrical lip carrying an external toothing so as to cooperate with the upper toothing of the meshing transmission pinion.

According to specific embodiments, the bezel is engaged in an axial annular groove of the middle, by means of a cylindrical lip carrying an internal toothing cooperating by meshing with a toothing of an intermediate pinion mounted such that it is free to rotate in a housing of the middle, said intermediate pinion being arranged so as to cooperate with the upper toothing of the transmission pinion.

According to specific embodiments, the bezel is bi-directional.

According to specific embodiments, the transmission pinion is engaged in a housing formed in the middle, said housing opening out at a lower end and at an upper end into radial openings.

According to specific embodiments, the housing opens out at the upper end into the axial annular groove of the middle and at the lower end into the radial bearing surface and into a recess with which the middle is provided, said recess being intended to receive a supporting sole.

According to specific embodiments, the housing opens out at the upper end into the axial annular groove of the middle and at the lower end into the radial bearing surface and into a plug sandwiched between a lower end of the transmission pinion and the back.

According to specific embodiments, a peripheral packing is sandwiched between the flange and the middle.

According to specific embodiments, the middle is provided with at least one hole receiving a spring-loaded push-piece, one elastically deformable end whereof is intended to cooperate with positioning cavities made in the bezel in order to generate a serration when the bezel is rotated.

According to specific embodiments, the bezel, the transmission pinion and the indicator each have a body to which the respective toothings thereof are attached.

BRIEF DESCRIPTION OF THE FIGURES

Other features and advantages of the invention will be better understood upon reading the following detailed description, which is given as a rough guide and in no way as a limiting guide, with reference to the accompanying drawings, in which.

DETAILED DESCRIPTION OF THE INVENTION

Figure 1:
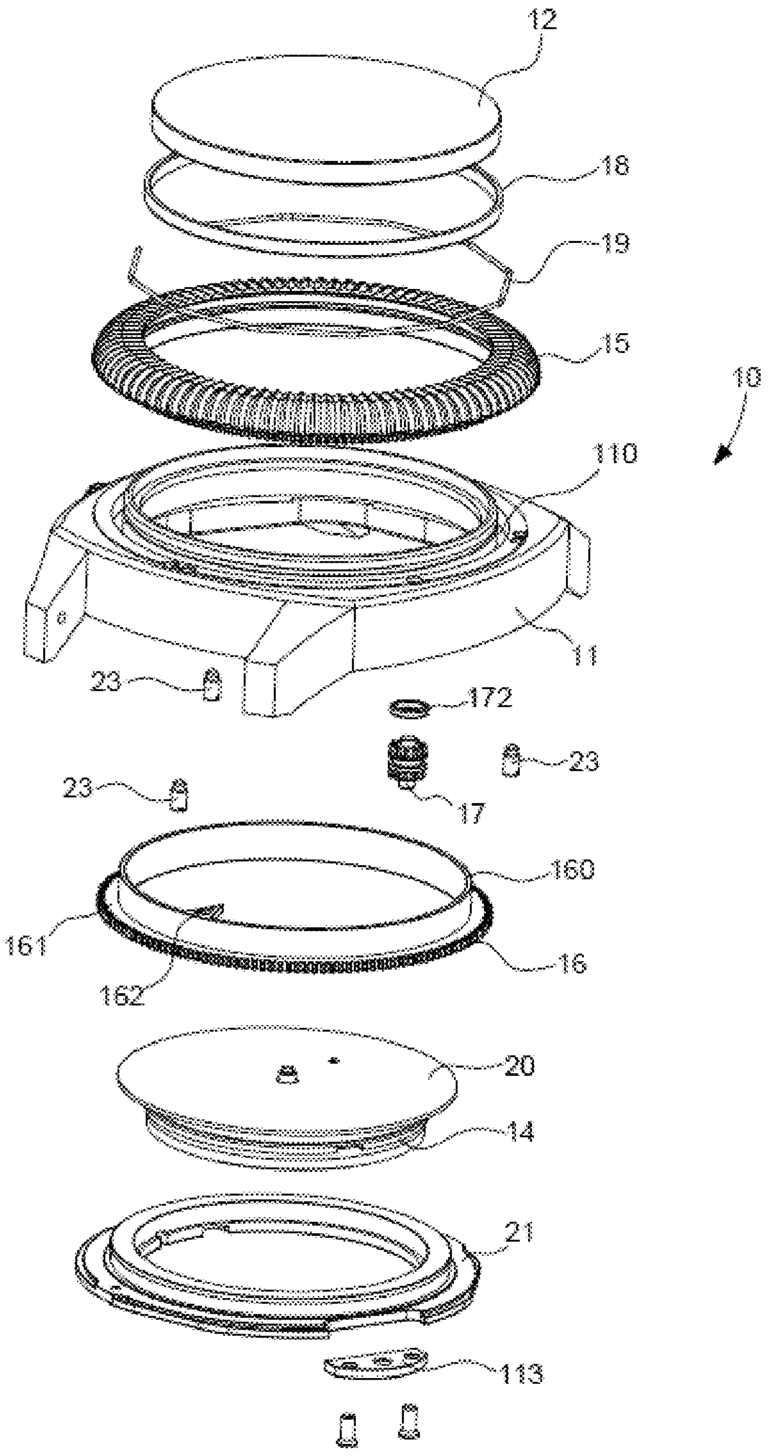
FIG. 1 shows a perspective, exploded, overhead view of the watch case according to a preferred example embodiment of the invention.

The present invention relates to a case 10 of a watch, as shown in FIG. 1, comprising a middle 11 to which are attached a crystal 12 and a back 13 delimiting an internal volume in which is arranged a horological movement 14 intended to drive displays displaying a time value, such as hours, minutes and optionally seconds. The displays can take the form of hands, discs, or any other form known to a person skilled in the art.

In the present invention, the horological movement 14 can be mechanical or electromechanical and is covered by a dial 20.

The case 10 according to the invention advantageously includes a mechanism for actuating a moving indicator 16 housed in the internal volume of the case 10.

The actuation mechanism includes a bezel 15 capable of moving in rotation and intended to be handled by a user, and a transmission pinion 17 arranged such that it meshes with the bezel 15 on the one hand, and with the indicator 16 on the other hand.

Advantageously, the respective axes of rotation of the bezel 15, the transmission pinion 17 and the indicator 16 are parallel to one another. This feature allows the actuating mechanism to be simple in design and highly reliable insofar as it has very few moving parts.

Figure 3:
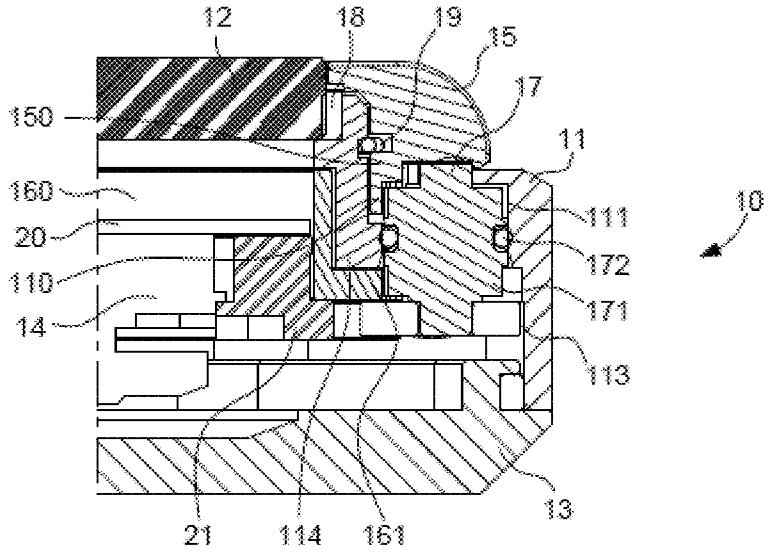
FIG. 3 shows a cross-sectional view of the case in FIG. 1.

Moreover, as can be seen in FIGS. 1 and 3, the bezel 15 is advantageously intended to pivot about the crystal 12, which is held in position in the middle 11 by a support packing 18.

The bezel 15 is engaged in the middle 11 and is held axially in position by a translation locking member, formed in the present example embodiment of the invention by a resilient ring 19 housed partially in an external radial groove of the middle 11, and partially in an internal radial groove of the bezel 15. The resilient ring 19 preferably comprises, in a manner known to a person skilled in the art, a succession of rectilinear segments connected to one another, or has an oblong shape, so as to form an open ring.

The bezel 15 is engaged in an axial annular groove 110 of the middle 11, by means of a cylindrical lip 150 carrying an external toothing. The axial annular groove 110 extends on a face referred to as the "upper face" of the middle 11.

The lip 150 of the bezel 15 forms a shoulder with a radial bearing surface 151 of the bezel 15 arranged facing the upper face of the middle 11.

In this text, the relative terms "upper" and "lower" are defined according to the orientation of the case 10 shown in FIGS. 1 and 3.

Figure 2:
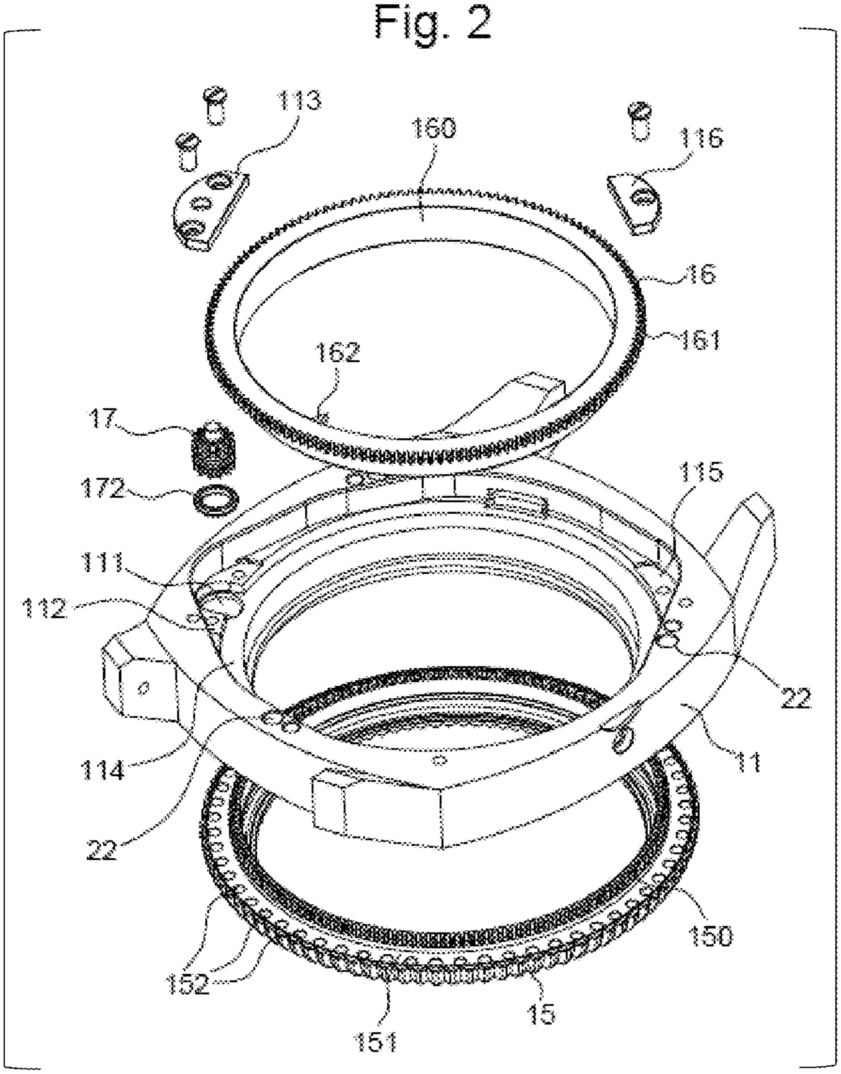
FIG. 2 shows a perspective, exploded, view from below of certain elements of the case in FIG. 1.

The middle 11 includes a substantially cylindrical housing 111 which receives the transmission pinion 17, visible in particular in the exploded view in FIG. 2.

The transmission pinion 17 comprises two coaxial toothings, respectively referred to as the "upper toothing" 170 and "lower toothing" 171 hereinbelow, separated from one another by a radial groove receiving a packing 172. The transmission pinion 17 comprises two opposite longitudinal ends forming pivots, respectively referred to as the "lower end" and "upper end" hereinbelow.

As shown in the cross-sectional view of FIG. 3, the packing 172 advantageously rests against a peripheral wall of the housing 111, so as to ensure an airtight and watertight seal between the internal volume of the case 10 and the outside.

The middle 11 includes, at a first end of the housing 111, referred to as the "upper end" and intended to be facing the bezel 15, a preferably penetrating hole opening out into the upper face of the middle 11 and guiding the rotation of the upper end of the transmission pinion 17.

Advantageously, the upper end of the housing 111 also opens out radially into the axial annular groove 110 of the middle 11, such that the upper toothing 170 of the transmission pinion 17 meshes with the toothing of the bezel 15, as shown in the cross-sectional view in FIG. 3.

A second end of the housing 111, referred to as the "lower end", opens out into a recess 112 provided in the middle 11. Advantageously, the recess 112 receives, in a fixed manner, a supporting sole 113 including a hole guiding the rotation of the lower end of the transmission pinion 17, as suggested by the exploded view in FIG. 2 and as shown by the cross-sectional view in FIG. 3.

The supporting sole 113 is preferably screwed to the middle 11 and has a shape that is complementary to that of the recess 112.

Moreover, the middle 11 comprises a radial bearing surface 114 facing which the indicator 16 is arranged. In the preferred example embodiment of the invention, the radial bearing surface 114 is oriented such that it is facing the back 13 as shown in the exploded view in FIG. 2, and forms a shoulder with the recess 112 such that the housing 111 opens out radially into said radial bearing surface 114.

More specifically, the indicator 16 is formed by a flange comprising a cylindrical wall 160 at a lower end whereof and from an outer face whereof extends a toothed radial lip 161, said radial lip 161 being arranged such that it extends facing the radial bearing surface 114 so as to co-operate, by meshing, with the lower toothing 171 of the transmission pinion 17.

Thus, the rotation of the bezel 15 drives, via the transmission pinion 17, the rotation of the flange. Preferably, the transmission ratios between the toothing of the bezel 15, the upper toothing 170 and lower toothing 171 and the toothing of the radial lip 161 of the flange are such that the bezel 15 and the flange rotate at the same angular velocity.

Preferably, the axes of rotation of the bezel 15 and of the flange are concentric.

The cylindrical wall 160 is sandwiched between the horological movement 14 and the middle 11, as shown in particular in the cross-sectional view in FIG. 3. Advantageously, the flange further includes an index 162, in the form of a graphical representation or relief extending radially from an inner face of the cylindrical wall 160, at the upper end thereof.

Advantageously, as shown in FIG. 2, the middle 11 can include a second recess 115 receiving, in a fixed manner, a second supporting sole 116, the supporting soles 113 and 116 being adapted, by the shape thereof, to constitute axial stops, preventing any axial motion of the flange, with the mechanical clearances allowing it to be driven in rotation.

Figure 4:
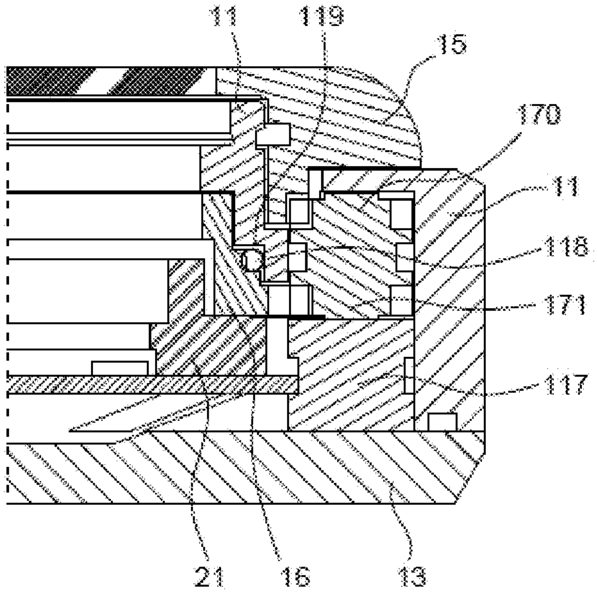
FIG. 4 shows a cross-sectional view of an alternative to the example embodiment of the watch case in FIG. 1.

Alternatively, as shown in FIG. 4, in place of the supporting soles 113 and 116, the case 10 includes a substantially cylindrical plug 117 sandwiched between the lower end of the transmission pinion 17, which it guides in rotation, and the back 13.

The plug 117 can be made of any suitable material, for example plastic material, and can be driven into a housing extending into the middle 11 and/or into a casing ring 21.

The dial 20 and the horological movement 14 are preferably held axially in position in the internal volume of the case 10 by the casing ring 21, in a manner known to a person skilled in the art.

Advantageously, in the example wherein the case 10 comprises the plug 117, a peripheral packing 118 can be sandwiched between the outer face of the flange and the middle 11.

More particularly, the peripheral packing 118 can be arranged in a groove 119 provided for this purpose, forming a shoulder with the radial bearing surface 114.

Such a peripheral packing 118 allows the flange to be held in position during the manufacture of the case 10, said flange being subsequently attached axially in the internal volume of the case 10 by the casing ring 21.

In the preferred example embodiment of the invention, the middle 11, on a lower face opposite the upper face thereof, is provided with at least one hole 22 opening out into said upper face. The hole 22 receives a spring-loaded push-piece 23 having an elastically deformable end extending through the upper face, said end being adapted to cooperate with positioning cavities 152 made in the bezel 15 in order to generate an indexing upon rotation of the bezel 15.

Preferably, sixty positioning cavities 152 are angularly distributed on the bezel 15 so that each angular position taken by the index corresponds to a division of one minute.

By way of a non-limiting example, three spring-loaded push-pieces 23 are arranged in the middle 11, at 120 degrees to one another.

In another example embodiment of the invention not shown in the figures, the bezel 15 can include, in place of an external toothing, an internal toothing, cooperating by meshing with a toothing of an intermediate pinion mounted such that it is free to rotate inside a housing of the middle 11. The intermediate pinion is arranged so as to cooperate with the upper toothing 170 of the transmission pinion 17.

One embodiment of the invention has been described, wherein the bezel 15, the transmission pinion 17 and the indicator 16 are made in one piece, the respective toothings thereof being formed directly in the bodies of said components.

Alternatively, the bezel 15, the transmission pinion 17 and the indicator 16 can each have a body to which the respective toothings thereof are attached, for example by driving or welding. Such an alternative embodiment, wherein the bezel 15, the transmission pinion 17 and the indicator 16 are each formed in two parts, is shown in FIG. 4.

This feature simplifies the manufacture of these components and thus reduces the respective manufacturing costs thereof.

The invention claimed is:

1. A watch comprising a case (10) and a middle (11) to which are attached a crystal (12) and a back (13) delimiting an internal volume in which is arranged a horological movement (14) intended to drive displays displaying a time value, said case (10) further comprising a mechanism for actuating an indicator (16) capable of moving in rotation and housed inside the internal volume of the case (10), wherein said actuation mechanism includes a bezel (15) capable of moving in rotation and intended to be handled by a user, and a transmission pinion (17) arranged such that it meshes with the bezel (15) and the indicator (16), the respective axes of rotation of the bezel (15), the transmission pinion (17) and the indicator (16) being parallel to one another, and wherein the transmission pinion (17) comprises an upper toothing (170) and a lower toothing (171), extending coaxially to one another such that the upper toothing (170) meshes with a toothing of the bezel (15) and such that the lower toothing (171) meshes with a toothing of the indicator (16).

2. The watch according to claim 1, wherein the bezel (15), the indicator (16) and the transmission pinion (17) are configured such that the bezel (15) and the indicator (16) pivot at the same angular velocity when the bezel is driven in rotation.

3. The watch according to claim 1, wherein the upper toothing (170) and lower toothing (171) are separated from one another by a radial groove that receives a packing (172).

4. The watch according to claim 1, wherein the indicator (16) is formed by a flange comprising a cylindrical wall (160) at a lower end of which a toothed radial lip (161) extends radially from an outer face of said cylindrical wall (160), said radial lip (161) being arranged facing a radial bearing surface (114) of the middle (11) so as to cooperate with the lower toothing (171) of the meshing transmission pinion (17), said flange further including an index extending from an inner face of the cylindrical wall (160).

5. The watch according to claim 4, wherein a housing (111) opens out at an upper end into an axial annular groove (110) of the middle (11) and at a lower end into the radial bearing surface (114) and into a recess (112) with which the middle (11) is provided, said recess (112) receiving a supporting sole (113).

6. The watch according to claim 4, wherein a housing (111) opens out at an upper end into an axial annular groove (110) of the middle (11) and at a lower end into the radial bearing surface (114) and into a plug (117) sandwiched between a lower end of the transmission pinion (17) and the back (13).

7. The watch according to claim 6, wherein a peripheral packing (118) is sandwiched between a flange and the middle (11).

8. The watch according to claim 1, wherein the bezel (15) is engaged in an axial annular groove (110) of the middle (11), by means of a cylindrical lip (150) carrying an external toothing so as to cooperate with the upper toothing (170) of the meshing transmission pinion (17).

9. The watch according to claim 1, wherein the bezel (15) is engaged in an axial annular groove (110) of the middle (11), by means of a cylindrical lip (150) carrying an internal toothing cooperating by meshing with a toothing of an intermediate pinion mounted such that it is free to rotate in a housing of the middle (11), said intermediate pinion being arranged so as to cooperate with the upper toothing (170) of the transmission pinion (17).

10. The watch according to claim 1, wherein the bezel (15) is bi-directional.

11. The watch according to claim 1, wherein the transmission pinion (17) is engaged in a housing (111) formed in the middle (11), said housing (111) opening out at a lower end and at an upper end into radial openings.

12. The watch according to claim 1, wherein the middle (11) is provided with at least one hole (22) receiving a spring-loaded push-piece (23), one elastically deformable end whereof is intended to cooperate with positioning cavities (152) made in the bezel (15) when the bezel (15) is rotated.

13. The watch according to claim 1, wherein the bezel (15), the transmission pinion (17) and the indicator (16) each have a body to which the respective toothings thereof are attached.

14. A watch comprising a case (10) and a middle (11) to which are attached a crystal (12) and a back (13) delimiting an internal volume in which is arranged a horological movement (14) intended to drive displays displaying a time value, said case (10) further comprising a mechanism for actuating an indicator (16) capable of moving in rotation and housed inside the internal volume of the case (10), wherein said actuation mechanism includes a bezel (15) capable of moving in rotation and intended to be handled by a user, and a transmission pinion (17) arranged such that it meshes with the bezel (15) and the indicator (16), the respective axes of rotation of the bezel (15), the transmission pinion (17) and the indicator (16) being parallel to one another, and wherein the transmission pinion (17) is engaged in a housing (111) formed in the middle (11), said housing (111) opening out at a lower end and at an upper end into radial openings.

15. The watch according to claim 14, wherein the bezel (15), the indicator (16) and the transmission pinion (17) are configured such that the bezel (15) and the indicator (16) pivot at the same angular velocity when the bezel is driven in rotation.

16. The watch according to claim 14, wherein the transmission pinion (17) comprises an upper toothing (170) and a lower toothing (171), extending coaxially to one another such that the upper toothing (170) meshes with a toothing of the bezel (15) and such that the lower toothing (171) meshes with a toothing of the indicator (16).

17. The watch according to claim 14, wherein the bezel (15) is bi-directional.

18. The watch according to claim 14, wherein the middle (11) is provided with at least one hole (22) receiving a spring-loaded push-piece (23), one elastically deformable end whereof is intended to cooperate with positioning cavities (152) made in the bezel (15) when the bezel (15) is rotated.

19. The watch according to claim 14, wherein the bezel (15), the transmission pinion (17) and the indicator (16) each have a body to which the respective toothings thereof are attached.

* * * * *